United States Patent
Ahmed et al.

(10) Patent No.: US 11,114,945 B2
(45) Date of Patent: Sep. 7, 2021

(54) SECONDARY-CONTROLLED ACTIVE CLAMP IMPLEMENTATION FOR IMPROVED EFFICIENCY

(71) Applicant: Cypress Semiconductor Corporation, San Jose, CA (US)

(72) Inventors: Rashed Ahmed, Fremont, CA (US); Hariom Rai, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/582,690

(22) Filed: Sep. 25, 2019

(65) Prior Publication Data

US 2021/0058000 A1    Feb. 25, 2021

Related U.S. Application Data

(60) Provisional application No. 62/890,411, filed on Aug. 22, 2019.

(51) Int. Cl.
*H02M 3/335* (2006.01)
*H02J 7/00* (2006.01)

(52) U.S. Cl.
CPC .......... *H02M 3/33592* (2013.01); *H02J 7/00* (2013.01); *H02M 3/33523* (2013.01)

(58) Field of Classification Search
CPC ...... H02M 1/08; H02M 1/34; H02M 3/33592; H02M 3/33576; H02M 3/33507; H02M 3/33569; H02M 3/33523; H02M 3/33553; H02M 2001/0058; H02M 2001/342; H02M 2001/344
See application file for complete search history.

(56) References Cited

U.S. PATENT DOCUMENTS

| | | | |
|---|---|---|---|
| 8,009,448 B2 | 8/2011 | Liu | |
| 9,087,656 B1* | 7/2015 | Vinciarelli | ............... H01H 9/54 |
| 9,419,531 B2 | 8/2016 | Zhilun et al. | |
| 9,473,032 B2 | 10/2016 | Sims et al. | |
| 10,008,947 B2 | 6/2018 | Vemuri et al. | |
| 10,098,202 B1* | 10/2018 | Xiong | .................. H05B 45/382 |
| 10,186,949 B1 | 1/2019 | Ferencz et al. | |
| 10,250,151 B1 | 4/2019 | Wu | |
| 10,250,152 B2 | 4/2019 | Chang et al. | |
| 2002/0021575 A1* | 2/2002 | Yasumura | ........... H02M 3/3385 363/21.04 |

(Continued)

FOREIGN PATENT DOCUMENTS

JP        6336784 B2    6/2018

OTHER PUBLICATIONS

Texas Instruments, "UCC28780 High Frequency Active Clamp Flyback Controller", Oct. 2017; 69 pages.

(Continued)

*Primary Examiner* — Gustavo A Rosario-Benitez

(57) ABSTRACT

Controlling an active clamp field effect transistor (FET) in a secondary-controlled active clamp converter is described. In one embodiment, an apparatus includes a primary-side FET coupled to a transformer, a secondary-side FET coupled to the transformer, and an active clamp FET disposed on a primary side of the transformer. A secondary-side controller is configured to control the active clamp FET across a galvanic isolation barrier.

17 Claims, 9 Drawing Sheets

(56) References Cited

U.S. PATENT DOCUMENTS

| | | | | |
|---|---|---|---|---|
| 2003/0012043 A1* | 1/2003 | Tsai | ............... | H02M 3/33523 363/178 |
| 2007/0086219 A1* | 4/2007 | Yasumura | ............ | H02M 3/3385 363/21.02 |
| 2008/0170419 A1* | 7/2008 | Lin | ............... | H02M 3/33592 363/20 |
| 2010/0188872 A1* | 7/2010 | Matsumoto | ............. | H02M 1/34 363/21.06 |
| 2011/0062782 A1* | 3/2011 | Coley | ............... | H02M 3/33592 307/43 |
| 2011/0292691 A1* | 12/2011 | Matsumoto | ....... | H02M 3/33523 363/21.12 |
| 2011/0305043 A1* | 12/2011 | Matsumoto | ....... | H02M 3/33592 363/21.01 |
| 2012/0081927 A1* | 4/2012 | Matsumoto | ....... | H02M 3/33523 363/21.05 |
| 2013/0063982 A1* | 3/2013 | Ye | ............... | H02M 3/33592 363/17 |
| 2015/0138845 A1* | 5/2015 | Shinozaki | ......... | H02M 3/33546 363/21.1 |
| 2016/0352231 A1* | 12/2016 | Quigley | ............ | H02M 3/33507 |
| 2017/0257033 A1* | 9/2017 | Liu | ............... | H02M 3/33507 |
| 2017/0346313 A1 | 11/2017 | Yao et al. | | |
| 2018/0117527 A1 | 5/2018 | Tohoda et al. | | |
| 2019/0036459 A1* | 1/2019 | Ding | ............... | H02M 3/33592 |
| 2019/0149056 A1* | 5/2019 | Zheng | ............... | H02J 7/0072 363/21.13 |

OTHER PUBLICATIONS

International Search Report for International Application No. PCT/US2020/046859 dated Sep. 16, 2020; 2.

Written Opinion of the International Searching Authority for International Application No. PCT/US2020/046859 dated Sep. 16, 2020; 8 pages.

\* cited by examiner

SECONDARY-CONTROLLED ACTIVE CLAMP IMPLEMENTATION FOR IMPROVED EFFICIENCY

RELATED APPLICATIONS

This application claims the benefit of U.S. Provisional Application No. 62/890,411, filed Aug. 22, 2019, the entire contents of which are incorporated by reference.

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. The USB-PD specification, however, allows power providers and power consumers to dynamically negotiate the levels of the provided voltages and currents. Under certain power delivery conditions, fault conditions can occur on the provided voltages/currents from the power provider, as well as other fault conditions can occur on the provided voltages/currents received by the power consumer.

BRIEF DESCRIPTION OF THE DRAWINGS

The disclosure is illustrated by way of example, and not of limitation, in the figures of the accompanying drawings.

DETAILED DESCRIPTION

Figure 1:
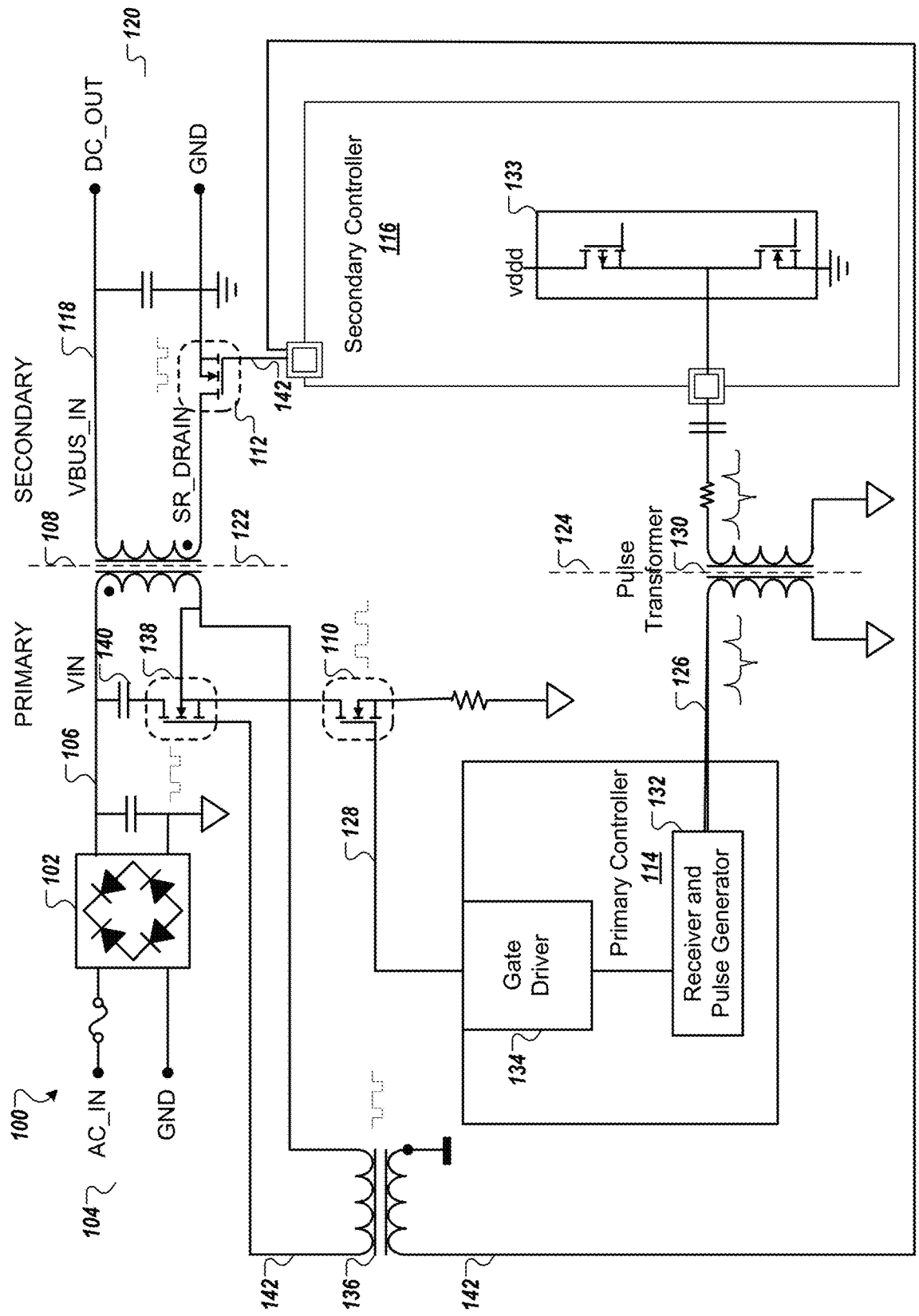
FIG. 1 is a block diagram of a secondary-controlled converter with secondary-controlled active-clamp control over a galvanic isolation barrier from a secondary side to a primary side according to one embodiment.

The following description sets forth numerous specific details such as examples of specific systems, components, methods, and so forth, in order to provide a good understanding of various embodiments of the techniques described herein for controlling an active clamp FET using a secondary-side controller in a secondary-controlled flyback converter, such as used in USB power delivery applications. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for controlling an active clamp FET using a secondary-side controller across a pulse transformer in a secondary-controlled flyback converter coupled to power lines in electronic devices in USB power delivery (USB-PD.) Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) for communication, battery charging, and/or power delivery. The embodiments described herein can be used for AC-to-DC power adapters, GaN based power adapters operating at 600 kHz frequencies, power adapters with primary or secondary side controllers, power adapters operating in modes of operations, such as quasi-resonant mode (QR), discontinuous conduction mode (DCM), continuous conduction mode (CCM), or the like. The embodiments described herein can be used in power-adapter solutions along with Type-C PD capability. These embodiments allow for more efficient performance allowing lower rated, and thus cheaper, FETs to be used by engaging the active clamp FET by the secondary-side controller, which determines to turn ON/OFF the active clamp FET based on parameters on the secondary-side. Active clamps may also help reduce electromagnetic interference (EMI) that helps in reducing filters on the input.

A USB-enabled electronic device or a system may comply with at least one release of a USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C, is defined in various releases and/or versions of the USB Type-C specification (e.g., such as Release 1.0 dated Aug. 11, 2014, Release 1.1 dated Apr. 3, 2015, etc.). The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification (e.g., such as Revision 1.0 released Jul. 5, 2012, Revision 2.0 released Aug. 11, 2014, etc., or later revisions/versions thereof). The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc.

According to the USB-PD specification, an electronic device is typically configured to deliver power to another device through a power path configured on a USB VBUS line. The device that provides power is typically referred to as (or includes) a "provider" (or a power source), and the device that consumes power is typically referred to as (or includes) a "consumer" (or a power sink). A power path typically includes a power switch coupled in-line on the VBUS line and configured to turn the delivery of power on and off.

A USB-PD power source may be configured to draw power from an alternating current (AC) power adapter or from another AC source. Thus, as part of an alternating current-to-direct current (AC-DC) conversion, some implementations may use a large bulk capacitor on the power source side of the VBUS line in order to remove the AC component of the power signal. Turn-ON and turn-OFF of power switches (also referred to as power FETs) may allow for further circuit protection based on analysis of current and voltage conditions and the detection of faults.

In one flyback converter, an active clamp FET is driven by a primary-side controller. However, a primary-side controller in a secondary-controlled flyback converter is designed without much intelligence since any intelligence added to the primary-side controller results in: larger chip area due to higher technology node, which results in higher costs; higher mask count due to the intelligence logic circuitry needing more fuses or non-volatile memory, which results in higher costs; and higher power loss due to additional circuit (current taken at higher voltages). Thus, in order to drive the active clamp FET, a primary-side controller can use a waveform signal that is 180 degrees out of phase with the waveform signal used to drive a primary-side FET. In such a setup, the active clamp FET may be engaged for a longer time than necessary, resulting in wasted energy and decreased efficiency. Further, the primary-side controller does not have access to electrical parameters related to the load requirements on the power output. As a result, the primary-side controller is not able to determine whether or not it may be beneficial to engage the active clamp FET or determine the duration of switching of the active clamp FET (e.g., the duration for which the active clamp FET is ON and the duration for which the active clamp FET is OFF), which may result in addition losses due to unnecessary gate switching.

Described herein are various embodiments of techniques for improving efficiency over the traditional flyback converter by controlling the active clamp FET from a secondary-side controller in a secondary-controlled converter. The embodiments of the secondary-controlled active clamp described herein may address the above-mentioned and other challenges without the additional logic and circuits and complicated protocols described above by controlling the active clamp FET from the secondary-side controller, independently of the control of the primary-side FET. In some embodiments, the secondary-controlled active clamp described herein may be used in a secondary-controlled flyback converter. Alternatively, the secondary-controlled active clamp can be used in other secondary-controlled converters. In some embodiments, the secondary-controlled active clamp may increase the efficiency over the traditional flyback converter by 3-4%. In some embodiments, the secondary-side controller can provide a control signal to control the active clamp FET on the primary side. In some embodiments, the active clamp FET on the primary side can be controlled to follow a synchronous rectification ON/OFF cycle of the secondary-side FET. In some embodiments, synchronous gate rectifier pulses from the secondary side may be used to switch the active clamp FET using a separate pulse transformer. The pulse transformer may be coupled between the secondary-side controller and the active clamp FET in order to control the active clamp FET. For example, a hardware-controlled scheme or a firmware-controlled scheme can define the control signal using multiple consecutive pulses (e.g., +ve or −ve pulses) given across a galvanic isolation barrier, such as across a pulse transformer, to control the active clamp FET from the secondary-side controller. The secondary-side controller may engage the active clamp FET for only the duration that a secondary-side FET is turned ON. In these embodiments, the secondary-side controller drives the active clamp FET, the primary-side FET, and the secondary-side FET. The secondary-side controls the active clamp FET to be switched in-phase with the secondary-side FET. The secondary-side controller further has access to electrical parameters (e.g., line/load information on the secondary side) on the secondary side and may use these parameters to determine whether or not it is beneficial to switch on the active clamp FET. The secondary-side controller may delay the active clamp FET turn-ON to avoid cross conduction, or may turn OFF the active clamp FET earlier to prevent keeping the active clamp FET ON for too long. If the secondary-side controller determines that it is beneficial to engage the active clamp FET, it may send the control signal across the pulse transformer to the active clamp FET to turn on the active clamp FET. As described above, a primary-side controller is not able to determine whether or not it may be beneficial to engage the active clamp FET or determine the duration of switching of the active clamp FET (e.g., the duration for which the active clamp FET is ON and the duration for which the active clamp FET is OFF), which may result in addition losses due to unnecessary gate switching. The secondary-side controller, however, can determine whether or not it may be beneficial to engage the active clamp FET or determine the duration of the switching of the active clamp FET, including the duration for which the active clamp FET is ON and the duration for which the active clamp FET is OFF.

The embodiments described herein may address the above-mentioned and other challenges by providing, a serial bus-compatible power supply device, such as a serial bus power delivery (SBPD) device with a power control analog subsystem having hardware, firmware, or any combination to communicate information, including a control signal from a secondary-side controller to intelligently drive an active clamp FET from a secondary side, across a galvanic isolation barrier. In one embodiment, the galvanic isolation barrier may be provided by a pulse transformer. In other embodiments, the galvanic isolation may be provided by an opto-coupler, a capacitive isolator, or the like. The SBPD (also referred to as a "source device" herein) may be a USB compatible power supply device. The embodiments described herein can also be implemented in other types of power adapters, power converters, power delivery circuits, or the like.

FIG. 1 is a block diagram of a secondary-controlled converter 100 with secondary-controlled active-clamp control over a galvanic isolation barrier from a secondary side to a primary side according to one embodiment. In some embodiments, the secondary-controlled converter 100 may be a secondary-controlled flyback converter. The secondary-controlled flyback converter 100 can be part of an AC-DC power adapter device. The secondary-controlled flyback converter 100 includes a rectifier 102 (e.g., full-bridge rectifier) coupled between AC input terminals 104 and a rectified DC line 106 (VIN), a flyback transformer 108, the flyback transformer 108 including a primary winding coupled to the rectified DC line 106, a primary-side power switch 110 (e.g., a primary-side FET, a power FET, or a primary FET), a secondary-side power switch 112 (e.g., secondary-side FET, power FET, or secondary FET), an active clamp FET 138, a primary-side controller 114, and a secondary-side controller 116. The rectified DC line 106 is coupled to a first end of a primary winding of the flyback transformer 108. VIN is the voltage on the rectified DC line 106 after the rectifier 102. A second end of the primary winding is coupled to a primary drain of the primary-side FET 110 and a source of the active clamp FET 138. The source node of the active clamp FET 138 is coupled to a primary drain of the primary-side FET 110. A drain node of the active clamp FET 138 is coupled to DC-blocking capacitor 140. Further, the gate and source nodes of the active clamp FET 138 are coupled to a pulse transformer 136, which is coupled also to the secondary-side controller 116. A first end of the secondary winding of the flyback transformer 108 is coupled to a direct current (DC) output line 118 (VBUS_IN) and a second end of the secondary winding is coupled to a secondary drain of the secondary-side FET 112 (SR_Drain). In an alternate embodiment, the DC blocking capacitor may be coupled between the drain node of the primary-side FET 110 and the source node of the active clamp FET 138. In this configuration, the drain node of the active clamp FET 138 is coupled directly to the rectified DC line. VBUS_IN is the voltage on the DC output of the flyback transformer 108. SR_Drain is the drain node of the secondary-side FET 112. The DC output line 118 and the secondary-side FET 112 are coupled to DC output terminals 120.

The secondary-controlled flyback converter 100 is used for AC-DC conversion with galvanic isolation between the inputs and any outputs. The secondary-controlled flyback converter 100 uses an inductor split with the flyback transformer 108 with a galvanic isolation barrier 122 between a primary side and a secondary side. When the primary-side power switch 110 (the primary-side FET) is closed, the primary-side of the flyback transformer 108 is connected to the input voltage source. In this embodiment, the primary-side of the flyback transformer 108 is coupled to the rectifier 102. As the primary current and magnetic flux in the flyback transformer 108 increases, energy is stored in the transformer core of the flyback transformer 108. The voltage induced in the secondary winding is negative and blocked by the secondary rectifier 112. When the primary-side power switch 110 (the primary-side FET) is opened, the primary current and magnetic flux drop. The secondary voltage is positive, allowing current to flow from the flyback transformer 108. The energy stored in the transformer is transferred to an output load. An output capacitor can be used to supply energy to the output load when the primary switch (e.g., the primary-side FET) is engaged. Thus, the flyback transformer 108, based on control of the primary-side power switch 110 can store energy and transfer the energy to the output of the secondary-controlled flyback converter 100. It should also be noted that the secondary-controlled flyback converter 100 can include other components in the input stage, in the output stage, or in both. For example, a bulk capacitor can be coupled between the output of the rectifier 102 and a ground node. During operation, the AC input power is rectified and filtered by the rectifier 102 (bridge rectifier) and the bulk capacitor. This creates a DC high voltage bus which is connected to the primary winding of the flyback transformer 108. Similarly, in the output stage, the secondary winding power is rectified and filtered, such as by a diode, a capacitor, output LC-filters, or the like, to reduce the output voltage ripple. Other output voltages can also be realized by adjusting the flyback transformer's turn ratio and the output stage. In some embodiments, other converters may be used instead of the flyback transformer, e.g., a switching converter, or the like.

The secondary-controlled flyback converter 100 operates as an isolated power converter. The two prevailing control schemes are voltage mode control and current mode control. Both control schemes use a signal related to the output voltage. An opto-coupler or a pulse transformer can be coupled to the secondary-side controller 116 and can send a signal to the primary-side controller 114 to indicate the output voltage, such as described in more detail below. The opto-coupler or the pulse transformer can be used to obtain tight voltage and current regulations.

In the depicted embodiment, the secondary-side controller 116 is configured for controlling the active clamp FET 138 on the primary side, the primary-side FET 110 on the primary side, and the secondary-side FET 112 on the secondary side. In one embodiment, the primary-side controller 114 is configured to receive a signal 126 from the secondary-side controller 116 across the galvanic isolation barrier 124. The primary-side controller 114 applies a pulse signal 128 to the primary-side FET 110, in response to the signal 126 to turn-on and turn-off the primary-side FET 110.

In one embodiment, the secondary-controlled flyback converter 100 includes a pulse transformer 130 coupled between the primary-side controller 114 and the secondary-side controller 116. The primary-side controller 114 is configured to receive the signal 126 from the secondary-side controller 116 as one or more pulses via the pulse transformer 130. The primary-side controller 114 can include a receiver and pulse generator 132 to receive the pulse signal 128 from the secondary-side controller 116 across the galvanic isolation barrier 124. The receiver and pulse generator 132 can change the primary-side turn-on pulse based on output of the flyback transformer 108 (e.g., Error Amplifier (EA) output). The primary-side turn-on pulse is used to turn on the primary-side FET 110. With higher EA voltages, wider pulse width modulation (PWM) pulses are sent from secondary-side controller 116 via pulse transformer 130 which results in wider primary turn-on pulses being used. The primary-side controller 114 can also include a gate driver 134 coupled to the receiver and pulse generator 132 to drive a gate of the primary-side FET 110. As described herein, the turn-on and turn-off pulses can have fixed widths or variable widths. In one embodiment, the receiver and pulse generator 132 can include a PWM circuit. Alternatively, the receiver and pulse generator 132 can use other types of circuits to receive the pulses across the galvanic isolation barrier 124.

In one embodiment, the primary-side controller 114, in order to apply the pulse signal 128 to the primary-side FET 110, is configured to receive a turn-on pulse (PTDRV) from the secondary-side controller 116. The primary-side controller 114 applies the turn-on pulse to the gate of the primary-side FET 110 via the gate driver 134. The turn-on pulse causes the primary drain of the primary-side FET 110 to go low (e.g., a first voltage level corresponding to a first state or representing the digital value of one). Subsequently, the primary-side controller 114 receives a turn-off pulse from the secondary-side controller 116 and applies the turn-off pulse to the gate of the primary-side FET 110 via the gate driver 134. The turn-off pulse causes the primary drain of the primary-side FET 110 to go high (e.g., a second voltage level corresponding to a second state or representing the digital value of zero).

In one embodiment, the secondary-side controller sends a control signal over input line 142 to the secondary-side FET 112 and sends the same control signal to the active clamp FET 138 via the pulse transformer 136. The active clamp FET 138 and the secondary-side FET 112 turn ON in-phase in response to receiving a turn-on pulse of the control signal. Subsequently, the active clamp FET 138 and the secondary-side FET 112 turn OFF in response to receiving a turn-off pulse of the control signal. As described herein, the turn-on and turn-off pulses of the control signal may have fixed widths or variable widths.

In one embodiment, the secondary-side controller 116 includes a programmable driver 133 to generate a signal 126 to send to the primary-side controller 114 over the galvanic isolation barrier 124. Using the programmable driver 133, the secondary-side controller is able to send any combination of 0s and 1s with a specific pattern (protocol) from the secondary-side controller 116 to the primary-side controller 114 without a requirement of clock synchronization. In one embodiment, the secondary-side controller 116 includes a state machine to synchronize each function of the primary-side controller 114 to be programmed (e.g., calibrated, trimmed, or the like). The secondary-side controller 116 can store other information, such as user-defined settings. For example, the user defined settings pertaining to the primary-side functionality, such as over-voltage (OV), under-voltage (UV), over-current (OC), short-circuit detection, over-temperature (OT), line voltage, peak current limits, or the like, can be stored in the non-volatile memory of the secondary-side controller 116. Firmware of the secondary-side controller 116 can transfer this information to the primary-side controller 114 in a similar manner at appropriate times, such as at boot-up or later during operation of the converter at a specific time.

In one embodiment, the secondary-side controller 116 includes a programmable driver 133 to generate a signal 142 to send to the active clamp FET 138 over a pulse transformer 136. Using the programmable driver 133, the secondary-side controller is able to send any combination of 0s and 1s with a specific pattern (protocol) from the secondary-side controller 116 to the active clamp FET 138. In one embodiment, the secondary-side controller 116 includes a state machine to synchronize each function of the primary-side controller 114 to be programmed (e.g., calibrated, trimmed, or the like). The secondary-side controller 116 can store other information, such as user-defined settings. For example, the user defined settings pertaining to controlling the active clamp FET 138, can be stored in the non-volatile memory of the secondary-side controller 116. Firmware of the secondary-side controller 116 can transfer this information to active clamp FET in a similar manner at appropriate times, such as at boot-up or later during operation of the converter at a specific time.

As illustrated in FIG. 1, the secondary-side controller 116 can communicate control signals for controlling all switches (e.g., the primary-side FET 110, the active clamp FET 138, and the secondary-side FET 112). A first control signal is communicated to the primary-side controller 114 over the galvanic isolation barrier 124, such as via the pulse transformer 130. A second control signal is communicated to the secondary-side FET 112 by the secondary-side controller. The same second control signal is communicated to the active clamp FET 138 over the pulse transformer 136. Additional details of the programmable driver 133 are described below with respect to FIG. 2.

Figure 2:
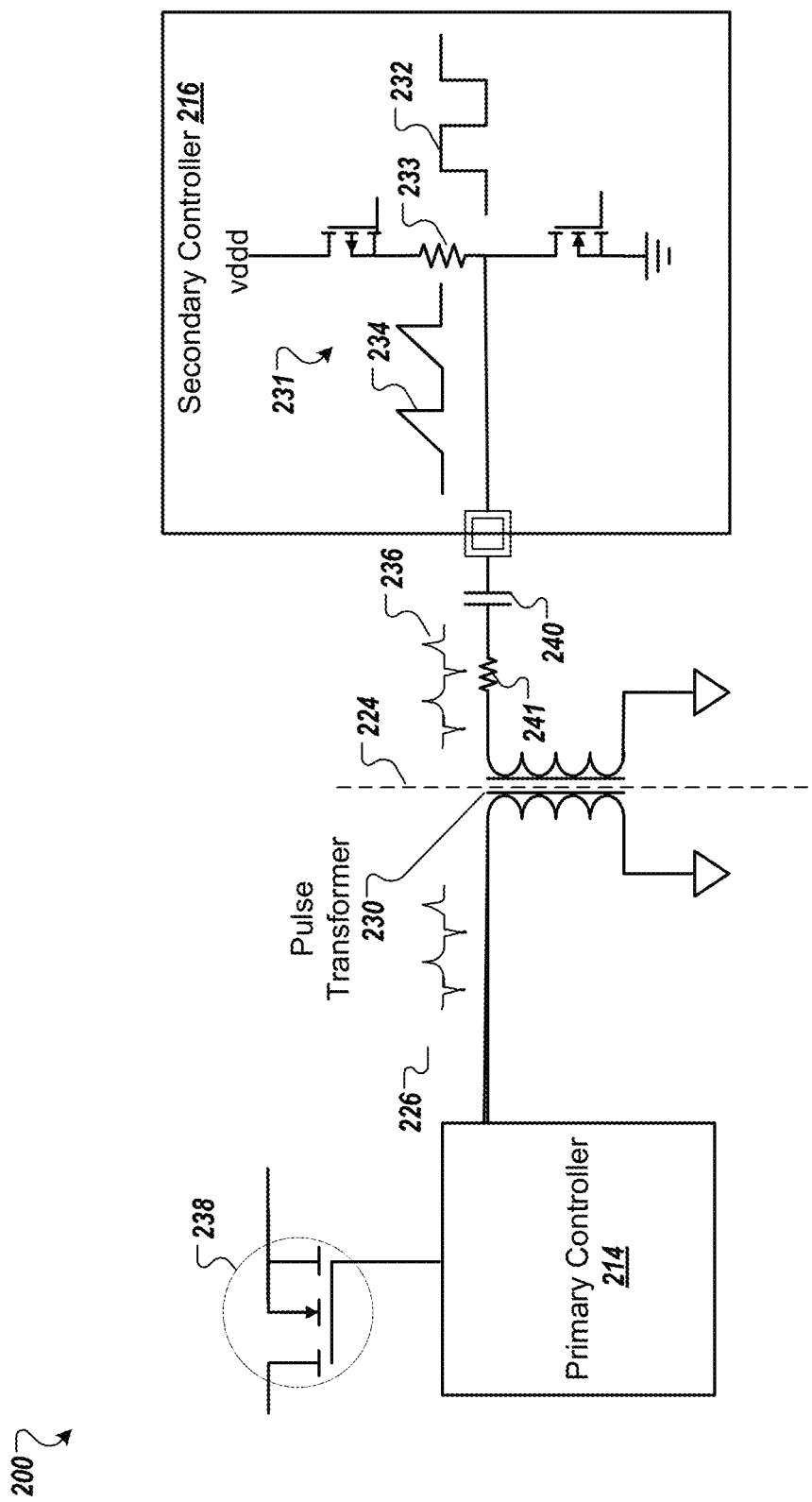
FIG. 2 is block diagram of a secondary-controlled flyback converter with a secondary-side controller that controls an active clamp FET on a primary side over a galvanic isolation barrier according to one embodiment.

FIG. 2 is block diagram of a secondary-controlled flyback converter 200 with a secondary-side controller 216 that controls an active clamp FET 238 on a primary side over a galvanic isolation barrier 224 according to one embodiment. Although not all components of the secondary-controlled flyback converter 200 are shown, the secondary-controlled flyback converter 200 is similar to the secondary-controlled flyback converter 100 of FIG. 1 as noted by similar reference numbers. In one embodiment, to control the active clamp FET 238, the secondary-side controller 216 can send pulses to the active clamp FET 238 across a galvanic isolation barrier 224, such as via a pulse transformer 230.

The secondary-side controller 216 includes a signal generator 231 to generate a signal (e.g., pulses) to control at least the active clamp FET 238 via the pulse transformer 230. For example, the signal generator 231 may generate a first signal to control a primary-side FET (not illustrated in FIG. 2) and a second signal to control the active clamp FET 238. For example, the signal generator 231 can include a pull-up transistor and a pull-down transistor. The pull-up and pull-down transistors can be controlled by control logic or firmware of the secondary-side controller 216. During a normal mode, the signal generator 231 can generate and output a square wave signal. A capacitor 240 is coupled between the signal generator 231 and the pulse transformer 230. The combination of resistor 241 and capacitor 240 generates a positive pulse on a positive transition of the square wave signal (i.e., rising edge) and a negative pulse on a negative transition of the square wave signal (i.e., falling edge). The positive and negative edges are transferred to the primary-side controller 214 via the pulse transformer 230. The primary-side controller 214 receives the positive and negative edges to create PWM pulses used to turn-on and turn-off the primary-side power switch (not illustrated in FIG. 2). Example waveforms of the square wave generated by the signal generator 231 are shown in FIG. 1. Example waveforms of the positive and negative pulses, generated by the capacitor are shown in FIG. 1.

The secondary-side controller 216 can generate the square wave signal 232 during normal operation (e.g., in a normal operating mode). In such cases, the secondary-side controller 216 can switch a resistor 233 between the pull-up transistor and the capacitor 240. It should be noted that the resistor 233 can be any type of resistive element. As a result, the signal generator 231 generates a sawtooth wave signal 234 with a slow rising edge and a faster falling edge than the slow rising edge. Given the edges of the sawtooth wave signal 234, the capacitor 240 does not generate a positive pulse for each pulse in the sawtooth wave signal 234, creating a pulse signal 236 with two or more consecutive negative pulses. The consecutive negative pulses of the pulse signal 236 are transferred to the primary-side controller 214 via the pulse transformer 230. The primary-side controller 214 receives the consecutive negative pulses to detect that the secondary-side controller 216 is communicating information to the primary-side controller 214 to control the active clamp FET 238. Although the pulse signal 336 includes two consecutive negative pulses (i.e., without any intervening positive pulses), which can represent two consecutive "0" values being sent across the galvanic isolation barrier 224, in other embodiments, other specific patterns can be generated by the secondary-side controller 216 and detected by the primary-side controller 214. For example, the secondary-side controller 216 can extend the signal generator 231 to generate two or more consecutive "1" values or even a pattern of 0s and 1s to give information from the secondary-side controller 216 to the primary-side controller 214 to control the active clamp FET 238. The other information may include a Start pattern, a Stop pattern, a Soft Fault asking for a soft-start operation, a Soft Fault asking for a minimum power delivered, or the like. Similarly, a resistor in series with a pull-down device can be used to generate consecutive 1s. In another embodiment, the secondary-side controller 216 can generate a PWM signal for transmissions by the secondary-side controller 216. That is, the secondary-side controller 216 can generate and a PWM signal to the pulse transformer 230 to communicate over the galvanic isolation barrier. Alternatively, the PWM signal can be communicated directly to the primary-side controller or the active clamp FET.

In some cases, two consecutive 0s requires two "−ve" pulses which then would not require any fast clock synchronization on the primary side. In the disclosed embodiments, the two consecutive 0s can be initiated by firmware after confirming a fault which requires system shutdown. The pull-up transistor and pull-down transistor can be controlled for a programmable slow pull-up at the input of the pulse transformer 230, followed by a sudden pull-down, resulting in "−ve" edge without a "+ve" edge. Similarly, another programmable slow pull-up followed by sudden pull-down would result in another "−ve" edge. It should be noted that the slow pull-up can be realized by switching the resistor 233 into the pull-up path. Alternatively, the slow pull-up can be realized by a current source-based pull-up.

Figure 3:
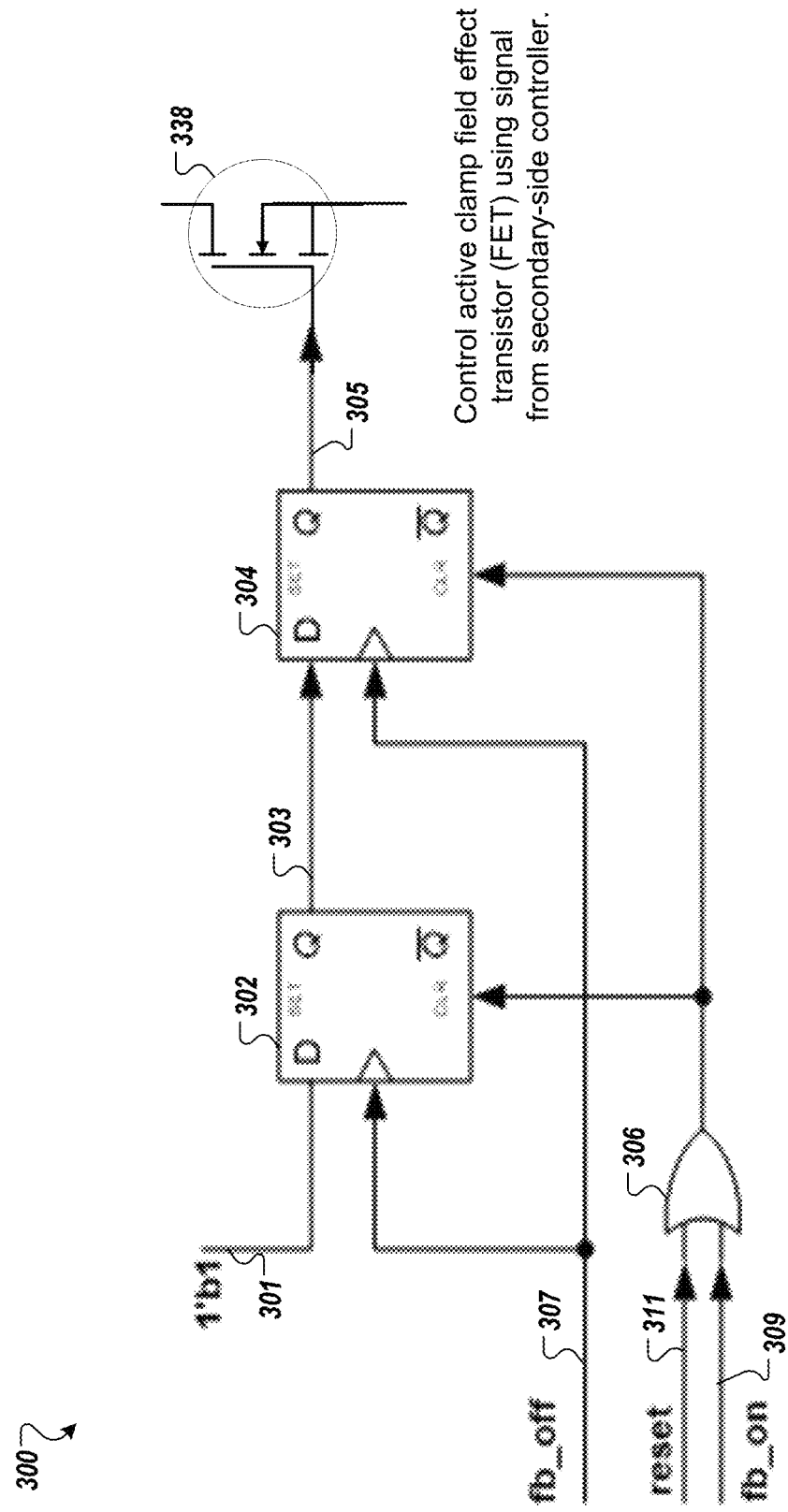
FIG. 3 is a block diagram of a circuit of a primary-side controller to detect a signal pattern from a secondary-side controller to control an active clamp FET according to one embodiment.

As illustrated in FIG. 2, the secondary-side controller 216 sends two consecutive 0s in the pulse signal 236 and the primary-side controller 214 receives two consecutive 0s in the pulse signal 226. The primary-side controller 214 can include circuitry to detect the two consecutive 0s in the pulse signal 226, such as illustrated in FIG. 3. Alternatively, the primary-side controller 214 can include circuitry to detect other patterns to detect information being communicated by the secondary-side controller 216.

FIG. 3 is a block diagram of a circuit 300 of a primary-side controller to detect a signal pattern from a secondary-side controller to drive active clamp FET 338 according to one embodiment. The circuit 300 includes a first flip-flop 302, a second flip-flop 304, and an OR gate 306. The first flip-flop 302 receives a first input value 301 (e.g., 1'b1) that initiate programming if propagated through both the first flip-flop 302 and the second flip-flop 304. The second flip-flop 304 receives a second input value 303 from an output of the first flip-flop 302 when the first flip-flop 302 is clocked by a high going pulse 307 corresponding to a 0 pulse (negative pulse 236 illustrated in FIG. 2) in the pulse signal received by the primary-side controller. The 0 pulse 307 is labeled as an fb_off signal that is an output of a pulse receiver circuit that will be high when the pulse goes negative from the pulse transformer. Similarly, an fb_on signal (signal 309) is the output of the pulse receiver circuit that will be high when the pulse goes positive from the pulse transformer. The second flip-flop 304 outputs an output value 305 when the second flip-flop 304 is clocked by a high going pulse 307 corresponding to a 0 pulse 226 (negative pulse in FIG. 2) in the pulse signal received by the primary-side controller. However, if an intervening high going pulse (positive pulse) at the input of primary controller from the pulse transformer 230 which corresponds to a high pulse 309 is received by the primary-side controller between the two 307 pulses, the first and second flip-flops are cleared. For example, when the OR gate 306 receives the high pulse 309 or a reset signal 311, the OR gate 306 can output a reset (or clear) signal to the clear inputs of both the first flip-flop 302 and second flip-flop 304. Although FIG. 3 shows one embodiment of the circuit 300 to detect two consecutive zeros, in other embodiments, the circuit 300 can include different logic or circuit components to detect the two consecutive zeros or other specific patterns in the pulse signal received by the primary-side controller across the galvanic isolation barrier.

In this embodiment, the output value 305 can initiate programming of the primary-side controller to control active clamp FET 338. For example, the primary-side controller 114 can receive pulses to switch the active clamp FET 338.

In another embodiment, an AC-DC power adapter device includes a flyback transformer coupled between AC terminals and DC terminals. The flyback transformer converts AC power on the AC terminals to DC power on the DC terminals with galvanic isolation between the AC terminals and the DC terminals. The AC-DC power adapter device also includes a primary-side controller and a secondary-side controller, both coupled to the flyback transformer. The flyback transformer is coupled to a primary-side power switch (e.g., a primary-side FET), a secondary-side power switch (e.g., a secondary-side FET), and an active clamp FET disposed on a primary side of the flyback transformer. The AC-DC power adapter device also includes a first pulse transformer with a galvanic isolation barrier between the primary-side controller and the secondary-side controller. The AC-DC power adapter device also includes a second pulse transformer with a galvanic isolation barrier between the secondary-side controller and the active clamp FET. The secondary-side controller controls the primary-side FET via the first pulse transformer and the primary-side controller. The secondary-side controller controls the secondary-side FET and the active-clamp FET in-phase (e.g. the active clamp FET is turned on when the secondary-side FET is turned on). The secondary-side controller controls the active clamp FET via the second pulse transformer.

In a further embodiment, the primary-side controller includes a pulse receiver and a gate driver, such as those described above. The pulse receiver receives the signal from the secondary-side controller across the galvanic isolation barrier, and the gate driver drives a signal at a gate of the primary-side FET to turn-on and turn-off the primary-side FET. In a further embodiment, the AC-DC power adapter device also includes a rectifier coupled between the AC source and an AC line (Vin). The AC line is coupled to the active clamp FET and a first end of a primary winding of the flyback transformer. A second end of the primary winding is coupled to a primary drain of the primary-side FET. A first end of the secondary winding of the flyback transformer is coupled to a DC output line (VBUS) and a second end of the secondary winding is coupled to a secondary drain of a secondary-side FET. A bulk capacitor is coupled between the AC line and a ground node. The primary-side controller, to apply the pulse signal to the primary-side FET, is configured to: receive a turn-on pulse from the secondary-side controller; apply the turn-on pulse to a gate of the primary-side FET, the turn-on pulse causing a primary drain of the primary-side FET to go high; receive a turn-off pulse from the secondary-side controller; and apply the turn-off pulse to the gate of the primary-side FET, the turn-off pulse causing the primary-side FET to go low.

Figure 4:
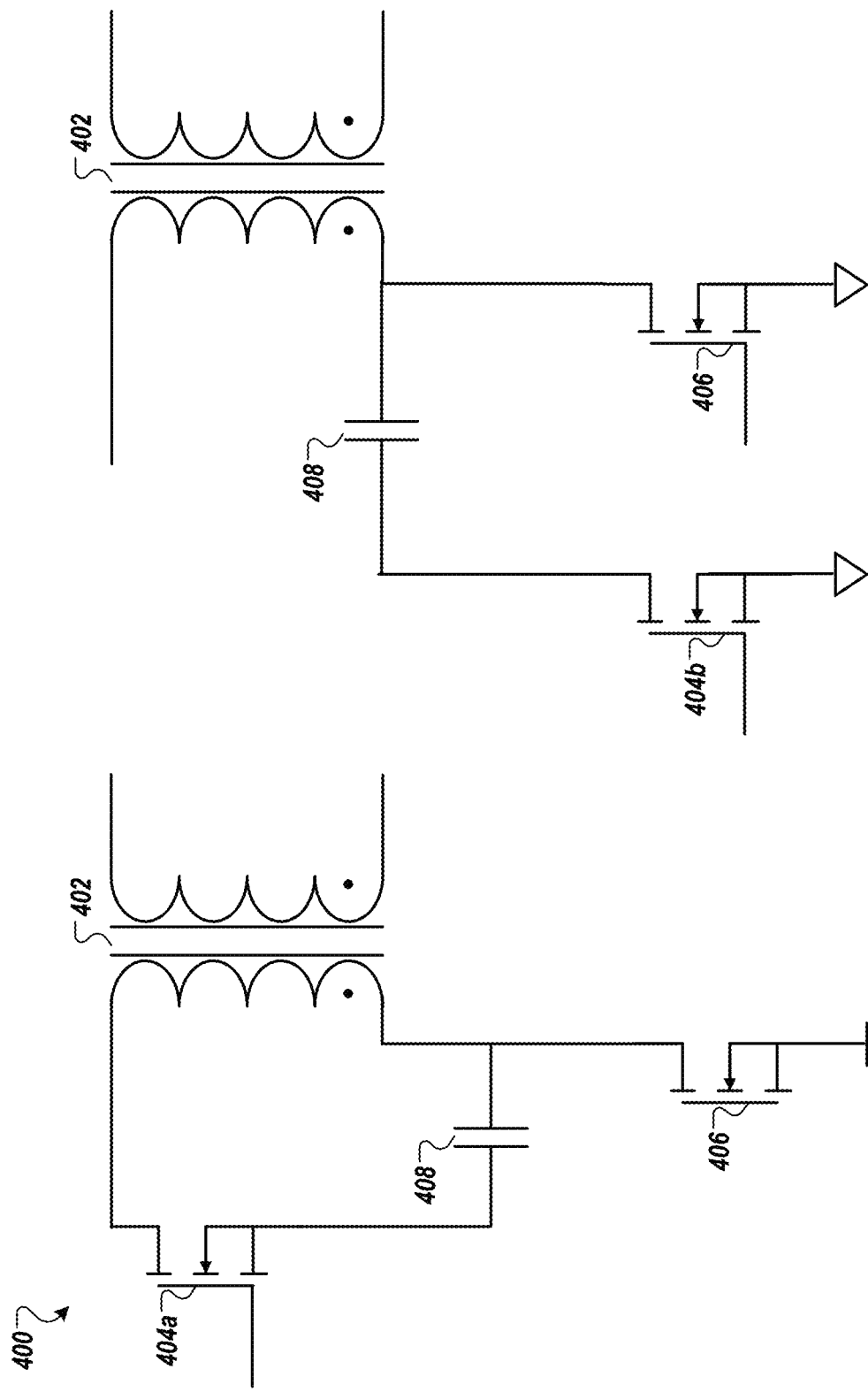
FIG. 4A is a block diagram of a circuit of an active clamp N-channel field effect transistor (NFET) according to one embodiment.
FIG. 4B is a block diagram of a circuit of an active clamp P-channel field effect transistor (PFET) according to one embodiment.

FIG. 4A is a block diagram of an active clamp N-channel field effect transistor (NFET) circuitry that is controlled from the secondary side by a secondary-side controller 116 which can send a control signal over a pulse transformer 136, described above in reference to FIG. 1. In one embodiment, the active clamp FET 404a may be an NFET. The active clamp FET 404a is coupled to a flyback converter 402 and to a capacitor 408 which serves as a DC block in the active clamp FET circuitry. In this embodiment, the active clamp NFET 404a has a floating ground (e.g., the source node of the active clamp FET 404a is not connected to a referenced voltage). The active clamp NFET 404a is switched on with a positive gate-source voltage and may be implemented in most circuits. The control signal sent from the secondary-side controller 116 via the pulse transformer 136 is input into the active clamp NFET 404a through the input line 142. Because the source node of the active clamp NFET 404a is a floating node, the active clamp NFET 404a can be driven by an opto-coupler, a capacitive isolator, a pulse transformer, as described herein.

FIG. 4B is a block diagram of an active clamp P-channel field effect transistor (PFET) circuitry that is controlled from the secondary side by a secondary-side controller 116 which can send a control signal over a pulse transformer 136, described above in reference to FIG. 1. Using the pulse transformer 136, the secondary-side controller 116 can send the control signal over a galvanic isolation barrier. In other embodiments, the secondary-side controller 116 can send a control signal directly to the PFET circuitry, instead of over a galvanic isolation barrier. The active clamp FET 404b is coupled to the flyback converter 402 and to a capacitor 408 which serves as a DC block in the active clamp circuitry. In this embodiment, the active clamp PFET 404b has a referenced ground (e.g., the source node of the active clamp FET is connected to a referenced voltage). Since the ground of the active clamp PFET 404b is not floating, this circuitry suffers less from electromagnetic interference (EMI) issues.

In other embodiments, the active clamp may be another type of transistor, e.g., an insulated-gate bipolar transistor (IGBT), or the like.

Figure 5:
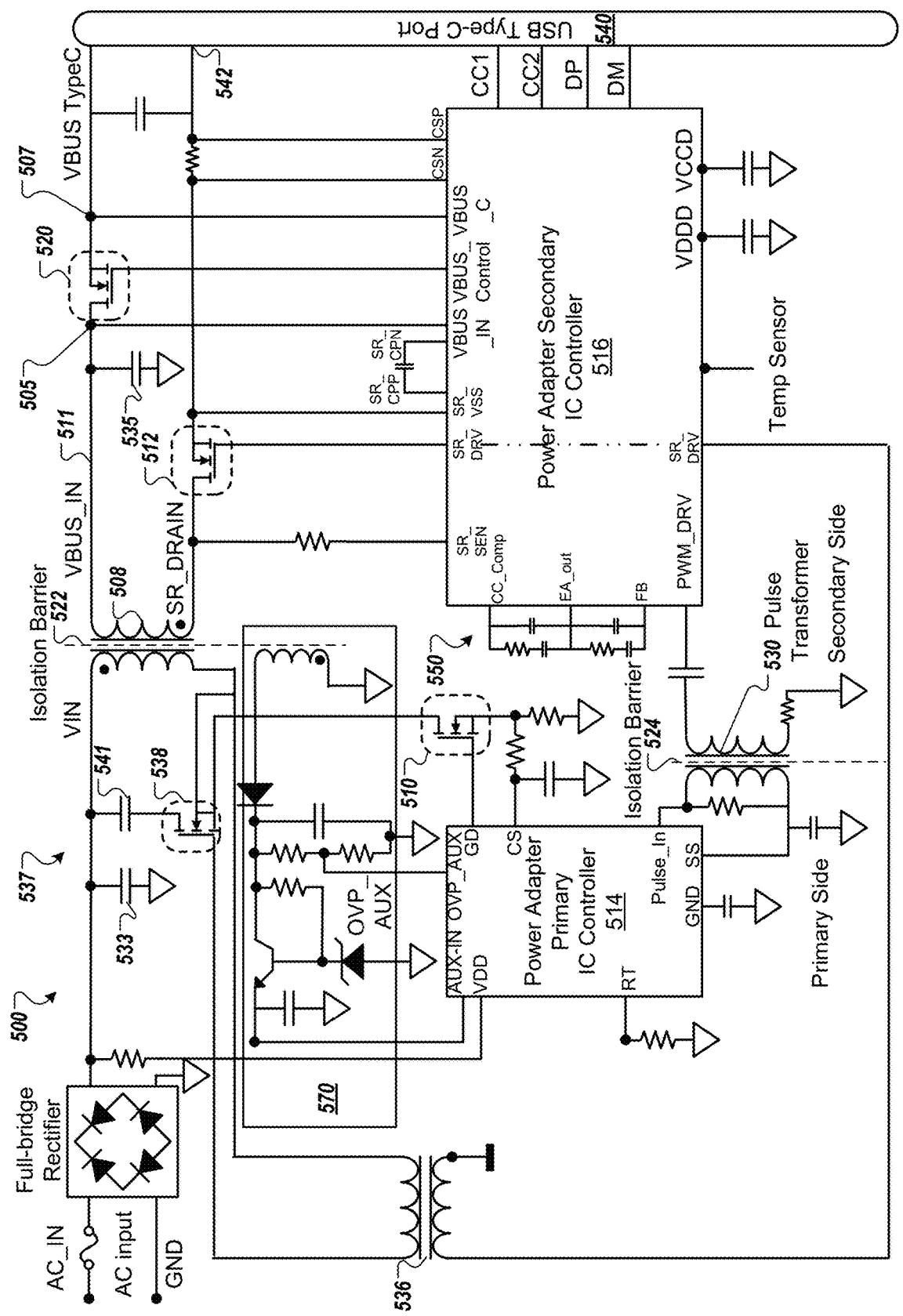
FIG. 5 is a schematic diagram of a USB-PD power adapter to send a control signal from a secondary-side controller over a galvanic isolation barrier to control an active clamp FET on the primary side according to one embodiment.

FIG. 5 is a schematic diagram of a USB-PD power adapter 500 to send a control signal from a secondary-side controller 516 over a galvanic isolation barrier to control an active clamp FET 538 on the primary side according to one embodiment. Instead of opto-isolator feedback, the USB-PD power adapter 500 controls a primary-side switch 510 (e.g., a primary-side FET 510) across the isolation barrier via a first pulse transformer 530, a flyback transformer 508, or both. The USB-PD power adapter 500 includes a primary IC controller 514 and a secondary IC controller 516. The secondary IC controller 516 of the USB-PD power adapter 500 further controls an active clamp FET 538 via a second pulse transformer 536. The secondary IC controller 516 may be disposed in a chip package and includes a USB-PD subsystem configured in accordance with the techniques for gate driver control described herein. The secondary IC controller 516 is configured to negotiate a PD contract with a consumer device (not shown) attached to USB Type-C port 540 and to control through an output pin ("PWM_DRV") the required VBUS voltage that is output from flyback transformer 508. USB Type-C port 540 is typically associated with a Type-C plug, but it should be understood that in various embodiments the USB Type-C port may be associated with a Type-C receptacle instead. The flyback transformer 508 is coupled to a rectified DC power source and the output can be coupled to a secondary-side FET 512 (e.g., SR_FET 512). The VBUS_IN is regulated by an error amplifier which is connected to a compensation network 550. The compensation network 550 can be a resistor-capacitor (RC) circuit specific to the design of the USB-PD power adapter 500. The compensation network 550 can be coupled to receive a feedback signal from a first output pin ("FB") of the secondary IC controller 516. The compensation network 550 can also be coupled to a second output pin ("EA_out)" and a third output pin ("CC_Comp"). The flyback transformer 508 can be coupled to a large bulk capacitor 533, and an active clamp circuit 538, and a DC-blocking capacitor 541. The USB-PD power adapter 500 may also include the pulse transformer 530 (or other feedback control mechanisms) for communicating information across an isolation barrier 524.

The secondary IC controller 516 is coupled to VBUS line 511 and is configured to control the operation and state of power switches (such as power switch 520) when fault conditions are detected by providing control signals to the gate of the switches. VBUS line 511 includes provider switch 520 configured as an on/off switch device controlled by signals from an output pin ("VBUS_Control") of a gate driver in the secondary IC controller 516. Power switch 520 may correspond to a provider FET described herein. On one side of provider switch 520, a power source node 505 on the VBUS line 511 is coupled to second winding of the flyback transformer 508, which is coupled to a large bulk capacitor 535 configured to remove the AC component of the power signal. Power source node 505 is coupled to an input pin ("VBUS_IN") of the secondary IC controller 516. On the other side of power switch 520, an output node 507 on the VBUS line 511 is coupled to USB Type-C port 540. Output node 507 is coupled to another input pin ("VBUS_C") of the secondary IC controller 516. The GND terminal 542 of USB Type-C port 540 is coupled to a secondary-side FET 512.

In operation, the direction of power flow on VBUS line 511 is from the flyback transformer 508 to a consumer device, such as a laptop computer (not shown), that is attached to USB Type-C port 540. When a PD contract with the consumer device is negotiated, the secondary IC controller 516 turns on the provider switch 520 to provide power to the consumer device at the negotiated voltage and/or current level(s). A high-to-low voltage transition on VBUS line 511 may be needed when the PD contract is dynamically re-negotiated to lower the VBUS voltage and/or current, e.g., when the consumer device has finished charging its battery and now needs power only to operate.

On detection of fault conditions, a control signal may be sent to turn off the provider switch 520, thereby disconnecting the USB Type-C port 540 from the flyback transformer 508. The provider switch 520 is turned off by driving the output of VBUS_Control to zero. This disconnection may be caused by an over-voltage condition, an over-current condition, or other conditions that may require disconnection of the USB Type-C port 540 from the flyback transformer 508 for protection of circuits coupled to the USB Type C port 540.

In a further embodiment, an auxiliary circuit 570 that can be coupled to the primary IC controller 514. An auxiliary output pin ("AUX_IN") and an overvoltage protection auxiliary pin ("OVP_AUX") are coupled to the auxiliary circuit 570. The auxiliary circuit 570 can operate to protect for overvoltage of the VBUS_IN 511 and also provide power (AUX_IN) to the primary IC controller 514 once start-up is complete. As noted above, the USB-PD power adapter 500 permits communications over the isolation barrier 524, the isolation barrier 522, the isolation barrier of the pulse transformer 536, or all in a similar manner as described above with respect to FIGS. 1-4. In particular, a PWM driver circuit of the secondary IC controller 516 can output a signal on an output pin ("PWM_DRV") to communicate information across the isolation barrier 524 via the pulse transformer 530. As noted herein, PWM driver circuit can be other driver circuits that create pulses on the output pin to communicate information across the isolation barrier 524. The primary IC controller 514 can include a detection circuit that receives a signal on an input pin ("Pulse_In") and detects when the secondary IC controller 516 is communicating information.

As noted above, the USB-PD power adapter 500 permits communications over the isolation barrier 524, the isolation barrier of the pulse transformer 536, or all in a similar manner as described above with respect to FIGS. 1-4. In particular, an SR driver circuit of the secondary IC controller 516 can output a signal on an output pin ("SR_DRV") to communicate a control signal across the isolation barrier of the pulse transformer 536. As noted herein, SR driver circuit can be other driver circuits that create pulses on the output pin to communicate information across the isolation barrier of the pulse transformer 536. The control signal transmitted across the pulse transformer 536 can be used to control active clamp FET 583.

In another embodiment, an AC-DC power adapter device includes a flyback converter (with a flyback transformer) or an isolated power converter that is coupled between AC terminals and DC terminals. The flyback transformer converts AC power on the AC terminals to DC power on the DC terminals with galvanic isolation between the AC terminals and the DC terminals. The AC-DC power adapter device also includes a primary-side controller coupled to the flyback transformer and a secondary-side controller coupled to the flyback transformer. A primary-side power switch (also referred to as a primary-side FET or primary FET) and an active clamp FET are coupled to a primary winding of the flyback transformer and the primary-side controller. A secondary-side power switch (also referred to as a secondary-side FET or secondary FET) is coupled to a secondary winding of the flyback transformer and the secondary-side controller. The primary-side controller is configured to receive a first signal from the secondary-side controller across a galvanic isolation barrier and apply a second signal to the primary-side power switch in response to the first signal to turn-on and turn-off the primary-side power switch. Alternatively, the primary-side controller is configured to receive a first signal directly from the secondary-side controller, instead of across a galvanic isolation barrier. The secondary-side controller is also configured to communicate information to the primary-side controller via a first pulse transformer coupled between the primary-side controller and the secondary-side controller. The secondary-side controller is also configured to send a control signal across a second pulse transformer coupled between the secondary-side controller and the active clamp FET to control the active clamp FET. The control signal that is sent by the secondary-side controller is the same control signal that is used to control the secondary-side FET. Also, the active clamp FET (ACF) control signal can be an independent signal where the duration of the active clamp FET can be controlled irrespective of a control signal sent to secondary-side FET. That is, a first control signal can control the switching of the active clamp FET (e.g., the duration that the active clamp FET is ON and the duration that the active clamp FET is OFF) and a second control signal can separately control the secondary-side FET. In another embodiment, all three FETS can be driven by three independent control signals.

In a further embodiment, the primary-side controller includes a pulse receiver and a driver. The pulse receiver receives the first signal from the secondary-side controller across the galvanic isolation barrier. The first signal includes a first turn-on pulse to turn on the primary-side power switch and a first turn-off pulse to turn off the primary-side power switch. In response, the driver, which is coupled to the pulse receiver and the primary-side power switch (e.g., the primary-side FET), applies the first turn-on pulse and the first turn-off pulse to the primary-side power switch.

In a further embodiment, the AC-DC power adapter device includes a first pulse transformer coupled between the primary-side controller and the secondary-side controller. The primary-side controller is configured to receive the first signal from the secondary-side controller as one or more pulses via the first pulse transformer. The primary-side controller can detect when the secondary-side controller is communicating information via the first pulse transformer as described herein. The AC-DC power adapter device further includes a second pulse transformer coupled between the secondary-side controller and the active clamp FET. The secondary-side controller is to send the second signal across the second pulse transformer to control the active clamp FET. The secondary-side controller sends the same second signal to control the secondary-side FET to switch in-phase with the active clamp FET.

The embodiments described herein can be implemented in a power delivery system, such as a serial bus-compatible power supply device. An example of a serial bus-compatible power supply device may include a serial bus power delivery (SBPD) device, a USB-compatible power supply device, or the like. In some embodiments, SBPD device is USB-PD device that is compatible with the USB-PD standard or more generally with the USB standard. For example, SBPD device may be used to provide an output voltage (e.g., Vbus_c, power supply voltage) based on an input voltage (e.g., Vbus_in, power supply voltage). The SBPD device may include the various embodiments described herein to facilitate communications between a primary-side controller and a secondary-side controller. The SBPD device may include a power converter (e.g., an AC-DC converter) and a power control analog subsystem (e.g., a USB-PD controller). The power control analog subsystem may include the circuitry, functionality, or both, as described herein for communicating information across a galvanic isolation barrier. The information can include information for different functions, such as OV, UV, OCP, SCP, PFC, SR, or the like. The information can include fault information for any of these different functions.

In other embodiments, the SBPD device is connected to power source, such as a wall socket power source that provides AC power. In other embodiments, power source may be a different power source, such as a battery, and may provide DC power to SBPD device. The power converter may convert the power received from power source (e.g., convert power received to Vbus_in). For example, power converter may be an AC-DC converter and convert AC power from power source to DC power. In some embodiments, power converter is a flyback converter, such as a secondary-controlled flyback converter, that provides galvanic isolation between the input (e.g., primary side) and the output (e.g., secondary side).

In some embodiments, the SBPD device provides Vbus_c to a sink device (e.g., via communication channel (CC) specifying a particular output voltage, and possibly an output current). SBPD device may also provide access to ground potential (e.g., ground) to the sink device. In some embodiments, the providing of the Vbus_c is compatible with the USB-PD standard. Power control analog subsystem may receive Vbus_in from power converter. The power control analog subsystem may output Vbus_in. In some embodiments, power control analog subsystem is a USB Type-C controller compatible with the USB Type-C™ standard. The power control analog subsystem may provide system interrupts responsive to the Vbus_in and the Vbus_c.

In some embodiments, any of the components of SBPD device may be part of an IC or alternatively any of the components of SBPD device may be implemented in its own IC. For example, power converter and power control analog subsystem may each be discrete ICs with separate packaging and pin configurations.

In some embodiments, the SBPD device may provide a complete USB Type-C™ and USB-Power Delivery port control solution for notebooks, dongles, monitors, docking stations, power adapters, vehicle chargers, power banks, mobile adaptors, and the like.

Embodiments when using isolation or level shifters may require some driver circuit. The driver circuit may be as simple as using a PWM output from the secondary-side controller, 516 to drive a capacitive coupled controller or opto-coupler. The driver circuit can be an elaborate structure when driving a pulse transformer.

In some embodiments, the secondary-controlled flyback converter may be a single-ended forward converter. In some embodiments, feed-forward information on the secondary side can be used to limit the maximum duty cycle that can be passed to the primary-side FET 510 and active clamp FET 538. The maximum duty cycle may change with line voltage. Line voltage is derived from transformer winding 508. In another embodiment, Line voltage is also available from SR_Drain node on the source pin of 512.

Figure 6:
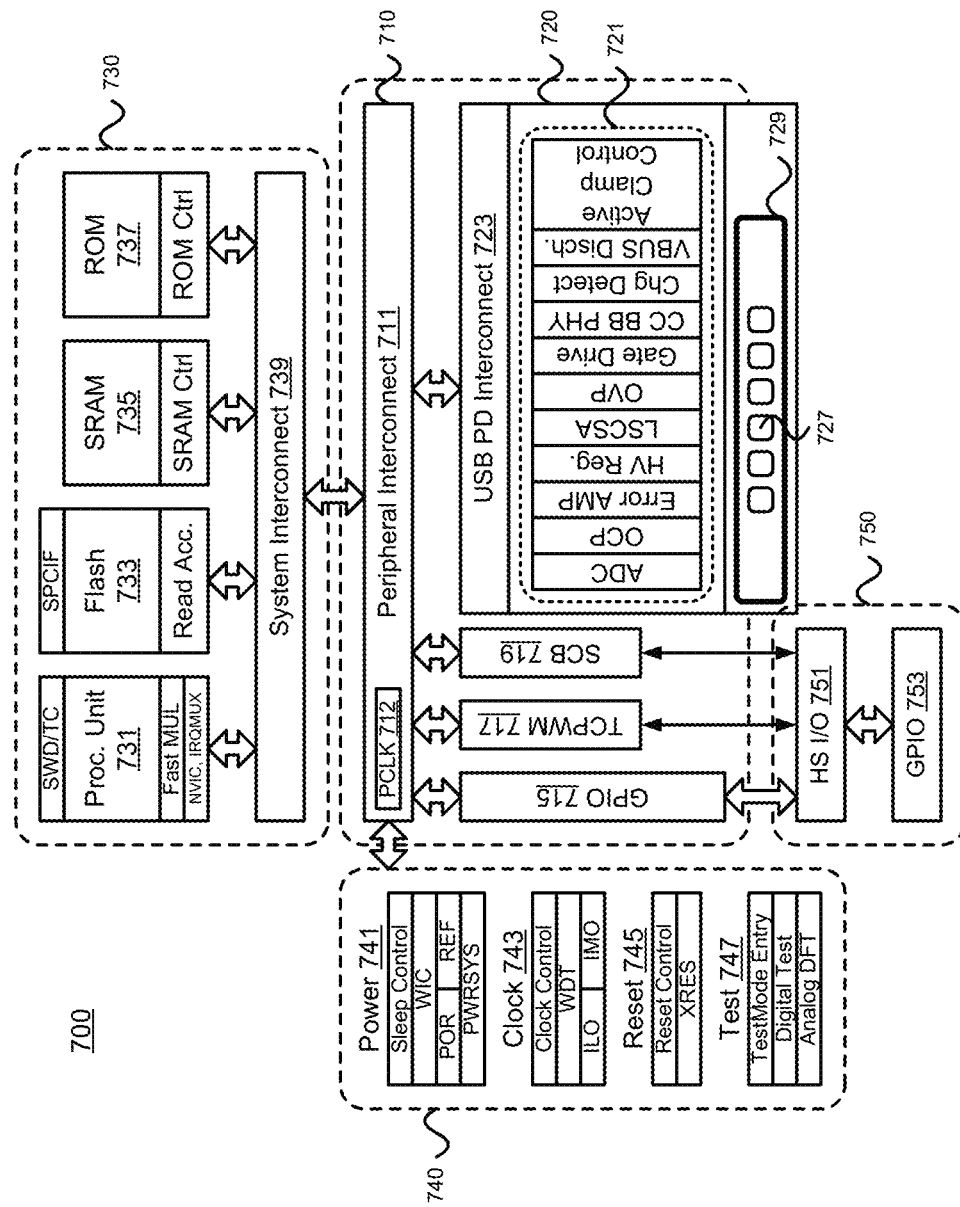
FIG. 6 is a block diagram illustrating a system for a USB device with a secondary-controlled active clamp FET for use in USB power delivery in accordance with some embodiments.

FIG. 6 is a block diagram illustrating a system 700 for a USB device with a secondary-controlled active clamp FET for use in USB power delivery in accordance with some embodiments. System 700 may include a peripheral subsystem 710 including a number of components for use in USB Power Delivery (USB-PD). Peripheral subsystem 710 may include a peripheral interconnect 711 including a clocking module, peripheral clock (PCLK) 712 for providing clock signals to the various components of peripheral subsystem 710. Peripheral interconnect 711 may be a peripheral bus, such as a single-level or multi-level advanced high-performance bus (AHB), and may provide a data and control interface between peripheral subsystem 710, CPU subsystem 730, and system resources 740. Peripheral interconnect 711 may include controller circuits, such as direct memory access (DMA) controllers, which may be programmed to transfer data between peripheral blocks without input by, control of, or burden on CPU subsystem 730.

The peripheral interconnect 711 may be used to couple components of peripheral subsystem 710 to other components of system 700. Coupled to peripheral interconnect 711 may be a number of general purpose input/outputs (GPIOs) 715 for sending and receiving signals. GPIOs 715 may include circuits configured to implement various functions such as pull-up, pull-down, input threshold select, input and output buffer enabling/disable, single multiplexing, etc. Still other functions may be implemented by GPIOs 715. One or more timer/counter/pulse-width modulator (TCPWM) 717 may also be coupled to the peripheral interconnect and include circuitry for implementing timing circuits (timers), counters, pulse-width modulators (PWMs) decoders, and other digital functions that may operate on I/O signals and provide digital signals to system components of system 700. Peripheral subsystem 710 may also include one or more serial communication blocks (SCBs) 719 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 710 may include a USB power delivery subsystem 720 coupled to the peripheral interconnect and comprising a set of USB-PD modules 721 for use in USB power delivery. USB-PD modules 721 may be coupled to the peripheral interconnect 711 through a USB-PD interconnect 623. USB-PD modules 721 may include an analog-to-digital conversion (ADC) module for converting various analog signals to digital signals; an error amplifier (AMP) regulating the output voltage on VBUS line per a PD contract; a high-voltage (HV) regulator for converting the power source voltage to a precise voltage (such as 3.5-5V) to power system 700; a low-side current sense amplifier (LSCSA) for measuring load current accurately, an over-voltage protection (OVP) module and an over-current protection (OCP) module for providing over-current and over-voltage protection on the VBUS line with configurable thresholds and response times; one or more gate drivers for external power field effect transistors (FETs) used in USB power delivery in provider and consumer configurations; and a communication channel PHY (CC BB PHY) module for supporting communications on a Type-C communication channel (CC) line. USB-PD modules 721 may also include a charger detection module for determining that a charging circuit is present and coupled to system 700 and a VBUS discharge module for controlling discharge of voltage on VBUS. The discharge control module may be configured to couple to a power source node on the VBUS line or to an output (power sink) node on the VBUS line and to discharge the voltage on the VBUS line to the desired voltage level (i.e., the voltage level negotiated in the PD contract). USB power delivery subsystem 720 may also include pads 727 for external connections and electrostatic discharge (ESD) protection circuitry 729, which may be required on a Type-C port. USB-PD modules 721 may also include a communication module for retrieving and communicating information, such as control signals such as from a secondary-side controller to a primary-side controller. In one embodiment, the USB-PD modules 721 include an active clamp control module in a secondary-side controller to control an active clamp FET disposed on a primary side (e.g., primary side of an AC-DC flyback converter).

GPIO 715, TCPWM 717, and SCB 719 may be coupled to an input/output (I/O) subsystem 750, which may include a high-speed (HS) I/O matrix 751 coupled to a number of GPIOs 753. GPIOs 715, TCPWM 717, and SCB 719 may be coupled to GPIOs 753 through HS I/O matrix 751.

System 700 may also include a central processing unit (CPU) subsystem 730 for processing commands, storing program information, and data. CPU subsystem 730 may include one or more processing units 731 for executing instructions and reading from and writing to memory locations from a number of memories. Processing unit 731 may be a processor suitable for operation in an integrated circuit (IC) or a system-on-chip (SOC) device. In some embodiments, processing unit 731 may be optimized for low-power operation with extensive clock gating. In this embodiment, various internal control circuits may be implemented for processing unit operation in various power states. For example, processing unit 731 may include a wake-up interrupt controller (WIC) configured to wake the processing unit up from a sleep state, allowing power to be switched off when the IC or SOC is in a sleep state. CPU subsystem 730 may include one or more memories, including a flash memory 733, and static random access memory (SRAM) 735, and a read-only memory (ROM) 737. Flash memory 733 may be a non-volatile memory (NAND flash, NOR flash, etc.) configured for storing data, programs, and/or other firmware instructions. Flash memory 733 may include a read accelerator and may improve access times by integration within CPU subsystem 730. SRAM 735 may be a volatile memory configured for storing data and firmware instructions accessible by processing unit 731. ROM 737 may be configured to store boot-up routines, configuration parameters, and other firmware parameters and settings that do not change during operation of system 700. SRAM 735 and ROM 737 may have associated control circuits. Processing unit 731 and the memories may be coupled to a system interconnect 739 to route signals to and from the various components of CPU subsystem 730 to other blocks or modules of system 700. System interconnect 639 may be implemented as a system bus such as a single-level or multi-level AHB. System interconnect 739 may be configured as an interface to couple the various components of CPU subsystem 730 to each other. System interconnect 739 may be coupled to peripheral interconnect 711 to provide signal paths between the components of CPU subsystem 730 and peripheral subsystem 710.

System 700 may also include a number of system resources 740, including a power module 741, a clock module 743, a reset module 745, and a test module 747. Power module 741 may include a sleep control module, a wake-up interrupt control (WIC) module, a power-on-reset (POR) module, a number of voltage references (REF), and a PWRSYS module. In some embodiments, power module 741 may include circuits that allow system 700 to draw and/or provide power from/to external sources at different voltage and/or current levels and to support controller operation in different power states, such as active, low-power, or sleep. In various embodiments, more power states may be implemented as system 700 throttles back operation to achieve a desired power consumption or output. For example, the secondary-side controller may access secondary electrical parameters on the secondary side. At low line and light load, the secondary-side controller may determine that the power state is such that it is not beneficial to switch on the active clamp FET. Clock module 743 may include a clock control module, a watchdog timer (WDT), an internal low-speed oscillator (ILO), and an internal main oscillator (IMO). Reset module 745 may include a reset control module and an external reset (XRES) module. Test module 747 may include a module to control and enter a test mode as well as testing control modules for analog and digital functions (digital test and analog DFT).

System 700 may be implemented in a monolithic (e.g., single) semiconductor die. In other embodiments, various portions or modules of system 700 may in implemented on different semiconductor dies. For example, memory modules of CPU subsystem 730 may be on-chip or separate. In still other embodiments, separate-die circuits may be packaged into a single "chip," or remain separate and disposed on a circuit board (or in a USB cable connector) as separate elements.

System 700 may be implemented in a number of application contexts to provide USB-PD functionality thereto. In each application context, an IC controller or SOC implementing system 700 may be disposed and configured in an electronic device (e.g., a USB-enabled device) to perform operations in accordance with the techniques described herein. In one example embodiment, a system 700 may be disposed and configured in a personal computer (PC) power adapter for a laptop, a notebook computer, etc. In another example embodiment, system 700 may be disposed and configured in a power adapter (e.g., a wall charger) for a mobile electronic device (e.g., a smartphone, a tablet, etc.). In another example embodiment, system 700 may be disposed and configured in a wall socket that is configured to provide power over USB Type-A and/or Type-C port(s). In another example embodiment, system 700 may be disposed and configured in a car charger that is configured to provide power over USB Type-A and/or Type-C port(s). In yet another example embodiment, system 700 may be disposed and configured in a power bank that can get charged and then provide power to another electronic device over a USB Type-A or Type-C port. In other embodiments, a system like system 700 may be configured with the power switch gate control circuitry described herein and may be disposed in various other USB-enabled electronic or electro-mechanical devices.

It should be understood that a system, like system 700 implemented on or as an IC controller may be disposed into different applications, which may differ with respect to the type of power source being used and the direction in which power is being delivered. For example, in the case of a car charger, the power source is a car battery that provides DC power, while in the case of a mobile power adapter the power source is an AC wall socket. Further, in the case of a PC power adapter the flow of power delivery is from a provider device to consumer device, while in the case of a power bank the flow of power delivery may be in both directions depending on whether the power bank is operating as a power provider (e.g., to power another device) or as a power consumer (e.g., to get charged itself). For these reasons, the various applications of system 700 should be regarded in an illustrative rather than a restrictive sense.

Figure 7:
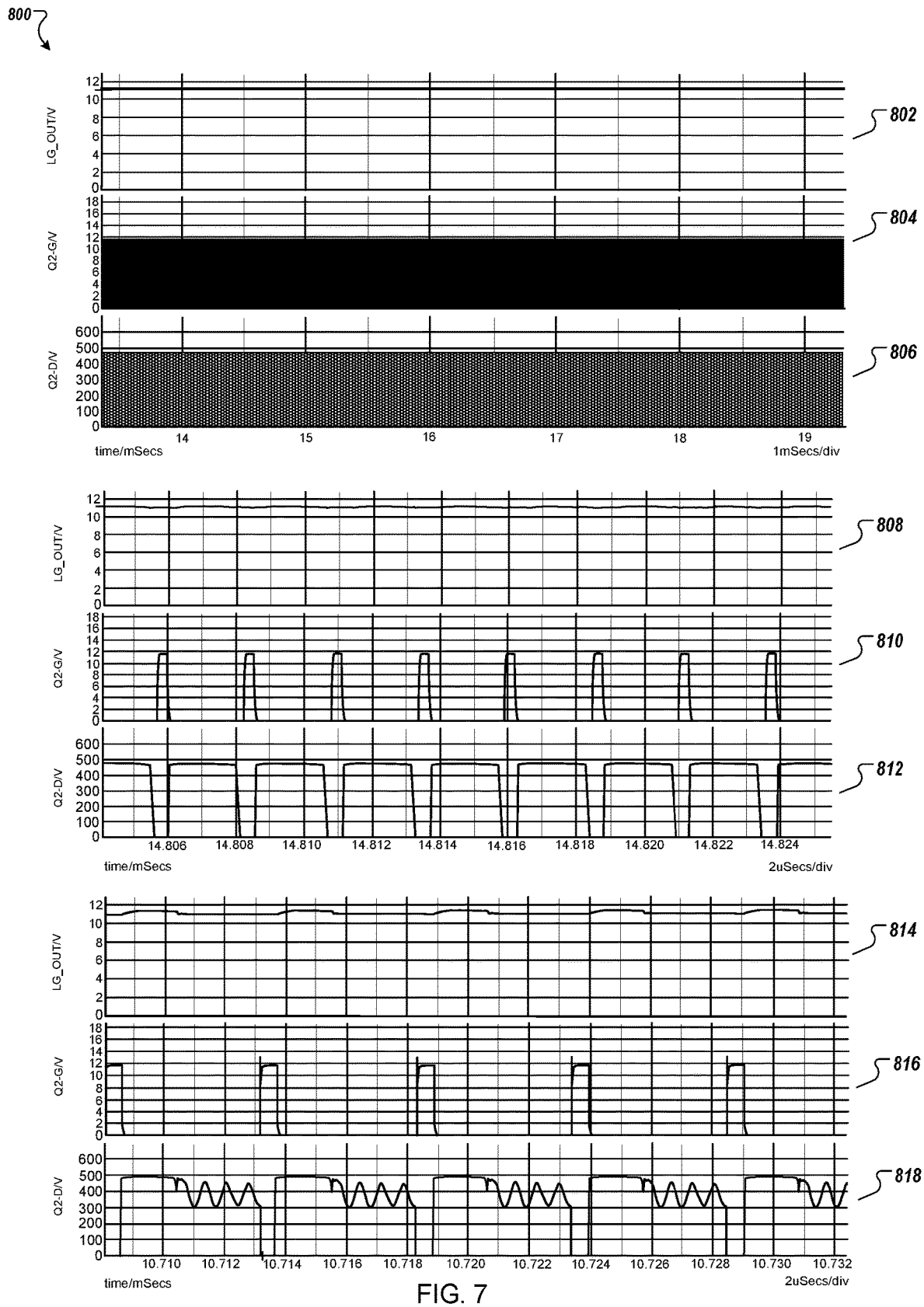
FIG. 7 is a waveform diagram illustrating an output voltage, a gate voltage of a primary-side FET, and a drain voltage of the primary-side FET of a secondary-controlled AC-DC flyback converter according to one embodiment.

FIG. 7 is a waveform diagram 800 illustrating output voltages 802, 808, and 818; gate voltages 804, 810, and 816 of a primary-side FET; and drain voltages 806, 812, and 818, all as a function of time, of the primary-side FET, under various cases, in a secondary-controlled AC-DC flyback converter, according to one embodiment. Waveform diagram 802 illustrates an output voltage of the secondary-controlled AC-DC flyback converter. The output voltage is constant, after an initial power-up phase (not visible in FIG. 7) according to one embodiment. Waveform diagram 804 illustrates the gate voltage of the primary-side FET Waveform diagram 806 illustrates the drain voltage of the primary-side FET. The next set of waveforms corresponds to voltages, of a secondary-controlled AC-DC flyback converter operating in continuous conduction mode (CCM). In particular, waveform 808 is the output voltage of the secondary-controlled AC-DC flyback converter operating in CCM. The waveform 810 illustrates the gate voltage of the primary-side FET, and the waveform 812 illustrates the drain voltage of the primary-side FET operating under CCM. The last set of waveforms corresponds to voltages, of a secondary-controlled AC-DC flyback converter operating in discontinuous conduction mode (DCM). In particular, waveform 814 is the output voltage of the secondary-controlled AC-DC flyback converter operating in DCM. The waveform 816 illustrates the gate voltage of the primary-side FET, and the waveform 818 illustrates the drain voltage of the primary-side FET operating under DCM. Referring back to FIG. 5, a secondary-side controller 516 controls an active clamp FET 538 to turn in sync with the secondary-side FET 512. The secondary-controlled AC-DC flyback converter takes an AC power source at the AC terminals and outputs a DC power source at the DC terminals. The corresponding output voltage 802, 808, and 814 are constant after an initial power-up phase. A control signal, also referred to as a driver signal or a main switch pulse width modulation (e.g., the change in the turn-on pulse based on error amplifier (EA) output), is applied to the gate of the primary-side FET. For example, a higher EA voltage results in a wider turn-on pulse. Due to the active clamp FET 538 which is also driven by the secondary-side controller, with a same control signal that is used to control a secondary-side FET, leakage energy is recovered by the active clamp FET 538 and the leakage energy is recycled onto a DC bus. The active clamp FET mitigates a leading-edge spike that occurs at every switching period as the primary-side FET is turned on, as illustrated by the voltage 806, 812, and 818 of the primary-side FET drain node. Mitigating the voltage spike helps reduce electromagnetic interference (EMI) in the system and allows a lower rated FET to be used as the main switching FET (primary-side FET). In other embodiments, the active clamp principal may be used in a single-ended forward converter.

Figure 8:
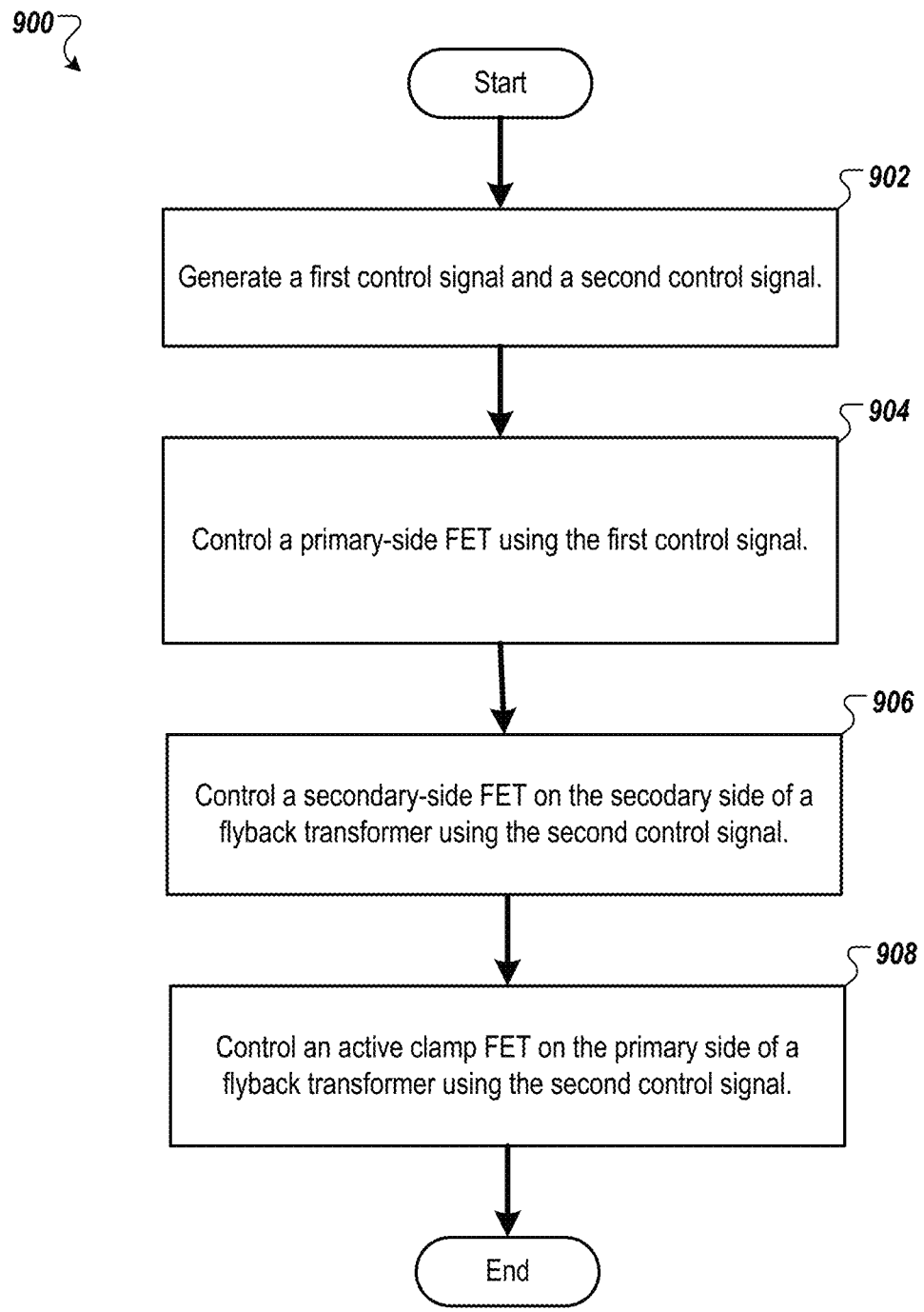
FIG. 8 is a flow diagram of a method of controlling an active clamp FET on a primary side across a galvanic isolation barrier by a secondary-side controller according to one embodiment.

FIG. 8 is a flow diagram of a method 900 of controlling an active clamp FET on a primary side across a galvanic isolation barrier by a secondary-side controller according to one embodiment. The method 900 may be performed by processing logic that comprises hardware (e.g., circuitry, dedicated logic, programmable logic, microcode, etc.), software, firmware, or a combination thereof. In one embodiment, a secondary-side controller in a secondary-controlled AC-DC flyback converter performs the method 900. In another embodiment, the secondary-side controller 116 of FIG. 1 performs the method 900. In another embodiment, the secondary-side controller 216 of FIG. 2 performs the method 900. In another embodiment, the secondary IC controller 516 of FIG. 5 performs the method 900. In another embodiment, the peripheral subsystem 710 of FIG. 6 performs the method 900.

Referring to FIG. 8, the method 900 begins by the processing logic generating a first control signal and a second control signal from a secondary-side controller across a galvanic isolation barrier (block 902). The processing logic sends the first control signal via a first pulse transformer coupled to the secondary-side controller and the primary-side controller to a primary-side FET (e.g., a primary-side power switch) which is coupled to a flyback transformer in a secondary-controlled AC-DC flyback converter to turn-on and turn-off the primary-side power switch (block 904). The processing logic sends the second control signal via a gate driver on the secondary-side controller to drive a secondary-side FET (block 906). The processing logic then sends the same second control signal via a second pulse transformer coupled to the secondary-side controller and an active clamp FET which is coupled to the flyback transformer and disposed on a primary side of the flyback transformer, to turn-on and turn-off the active clamp FET (block 908).

In a further embodiment, the processing logic sends the first control signal and the second control signal as pulse signals across the galvanic isolation barrier. The first control signal includes pulse information to turn-on and turn-off the primary-side FET. The second control signal includes pulse information to turn-on and turn-off the active clamp FET. The processing logic further sends the same second control signal to a secondary-side FET to control the secondary-side FET in-phase with the active clamp FET. In some cases, the pulse receiver generates the pulse signal with one or more pulses with the first pulse width in response to the signal received from the secondary-side controller across the galvanic isolation barrier. Processing logic can vary the first pulse width of the pulse signal to the second pulse width by generating the pulse signal with one or more additional pulses with the second pulse width. In another embodiment, to send the first control signal to the primary-side FET, the processing logic generates a first PWM pulse signal and applies the first PWM pulse signal to a secondary side of a first pulse transformer. Applying the first PWM pulse signal to the secondary side of the first pulse transformer induces a signal on a primary side of the first transformer to send the first PWM pulse signal to the primary-side controller. A pulse receiver of the primary-side controller can receive the signal on the primary side of the first pulse transformer and output a control signal to a gate of the primary-side FET via a first gate driver of the primary-side controller. The first control signal turns the primary-side FET on and off to control a flyback transformer of a power converter. In another embodiment, to send the second control signal to the active clamp FET, the processing logic generates a second PWM pulse signal and applies the second PWM pulse signal to a secondary side of a secondary pulse transformer. Applying the second PWM pulse signal to the secondary side of the second pulse transformer induces a signal on a primary side of the second transformer to send the second PWM pulse signal to the active clamp FET in order to drive the active-clamp FET.

In another embodiment, since the secondary-side controller is on the secondary side, the secondary-side controller has access to secondary electrical parameters that can be computed, including line and load information on the secondary side. For example, at low line and light load, the secondary-side controller may determine that it is not beneficial to switch on (e.g., engage) the active clamp FET. This may improve efficiency by minimizing unnecessary gate switching losses. Additionally or alternatively, the secondary-side controller may determine a duration of the active clamp FET based on output power and input voltage.

In another embodiment, the processing logic on the secondary-side controller uses the same control signal to control the active clamp FET on the primary side and the secondary-side FET on the secondary side. In this case, the active clamp FET and the secondary-side FET are switched in-phase, allowing the active clamp FET to stay on for the duration that the secondary-side FET is on, and not any longer. The processing logic uses a different control signal to control the primary-side FET. Since the active clamp FET is not required to stay on during the full duration that the primary-side FET is off, there is no artificial dead time required between the active clamp FET and the primary-side FET.

Figure 9:
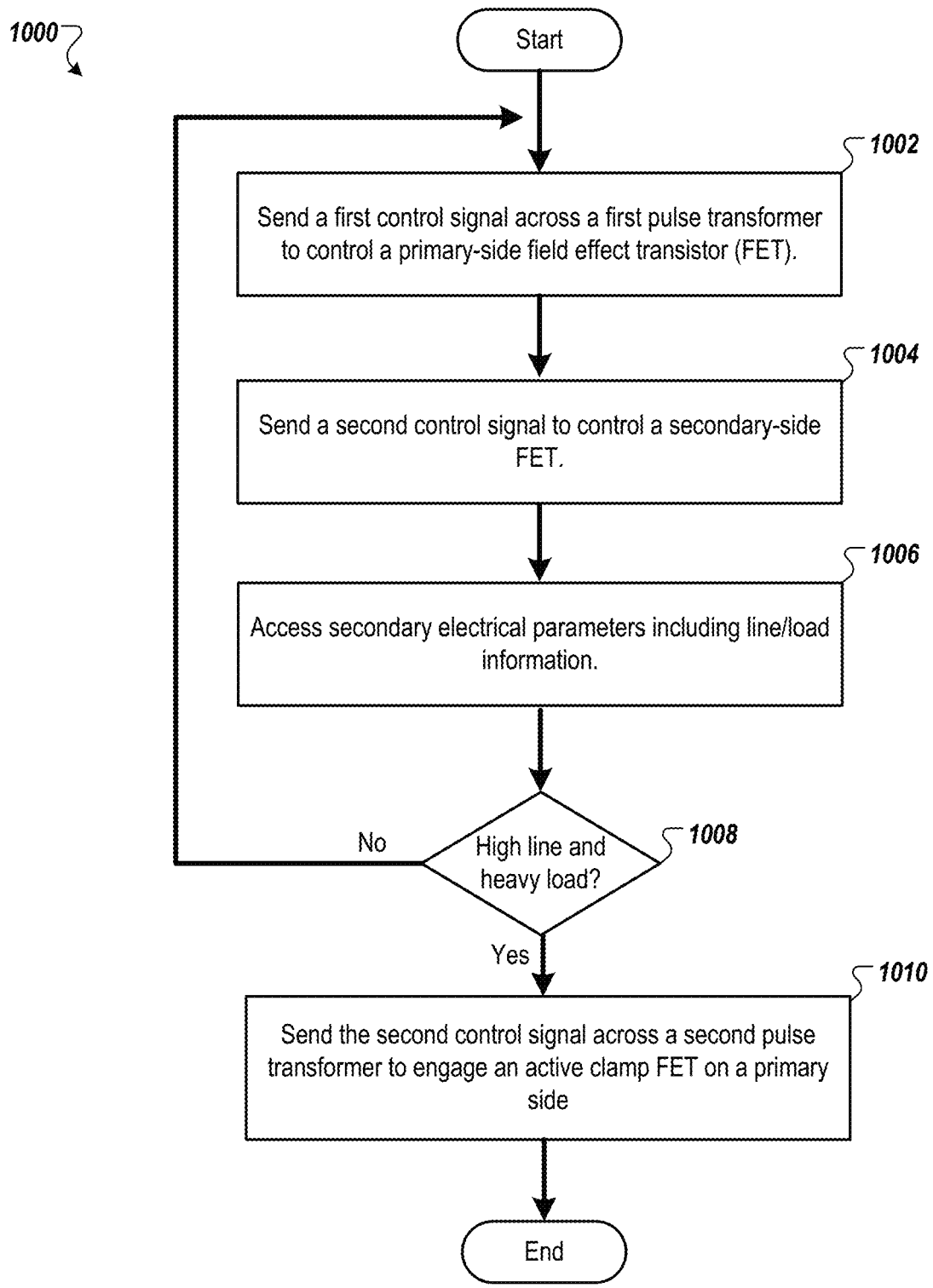
FIG. 9 is a flow diagram of a method of controlling an active clamp FET on the primary side and a primary-side FET, with a secondary-side controller across a galvanic isolation barrier and controlling a secondary-side FET with the secondary-side controller according to another embodiment.

FIG. 9 is a flow diagram of a method 1000 of controlling an active clamp FET on the primary side and a primary-side FET with a secondary-side controller across a galvanic isolation barrier and controlling a secondary-side FET with the secondary-side controller according to another embodiment. The method 1000 may be performed by processing logic that comprises hardware (e.g., circuitry, dedicated logic, programmable logic, microcode, etc.), software, firmware, or a combination thereof. In one embodiment, a secondary-side controller in a secondary-controlled AC-DC flyback converter performs the method 1000. In another embodiment, the secondary-side controller 116 of FIG. 1 performs the method 1000. In another embodiment, the secondary-side controller 216 of FIG. 2 performs the method 1000. In another embodiment, the secondary IC controller 516 of FIG. 5 performs the method 1000. In another embodiment, the peripheral subsystem 710 of FIG. 6 performs the method 1000.

Referring to FIG. 9, the method 1000 begins by the processing logic sending a first control signal to a primary-side FET (block 1002) and sending a second control signal from a secondary-side controller via a gate driver on the secondary-side controller to control a secondary-side FET (block 1004). The processing logic sends the first control signal via a first pulse transformer coupled to the secondary-side controller and the primary-side controller to a primary-side FET (e.g., a primary-side power switch) which is coupled to a flyback transformer in a secondary-controlled AC-DC flyback converter to turn-on and turn-off the primary-side power switch. The processing logic accesses secondary electrical parameters including line and load information on the secondary side (block 1006). The processing logic determines whether to engage an active clamp based on the secondary electrical parameters (block 1008). For example, at low line and light load, the processing logic may determine that it is not beneficial to switch the active clamp FET and the active clamp FET is not engaged (e.g., the processing logic does not send the second control signal across a second pulse transformer to the active clamp FET). Additionally or alternatively, at high line and heavy load, the processing logic may determine that it is beneficial to switch on the active clamp FET. In this case, the processing logic then sends the same second control signal via the second pulse transformer coupled to the secondary-side controller and an active clamp FET which is coupled to the flyback transformer and disposed on a primary side of the flyback transformer, to turn-on and turn-off the active clamp FET (block 1010).

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A secondary-side controlled alternating current to direct current (AC-DC) converter comprising:
    a primary-side field effect transistor (FET);
    a secondary-side FET;
    a transformer of the AC-DC converter, wherein the transformer is coupled to the primary-side FET and the secondary-side FET;
    an active clamp FET coupled to the primary-side FET, wherein the active clamp FET is disposed on a primary side of the transformer; and
    a secondary-side controller coupled to the transformer, wherein the secondary-side controller is configured to generate a first control signal and a second control signal, the first control signal to control the primary-side FET via a primary-side controller across a first pulse transformer coupled between the primary-side controller and the secondary-side controller, and the second control signal to control the active clamp FET across a galvanic isolation barrier provided by a second pulse transformer, wherein a gate of the active clamp FET is directly coupled to a primary winding of the second pulse transformer.

2. The secondary-side controlled AC-DC converter of claim 1, wherein the secondary-side controller is to send the second control signal to the active clamp FET via the second pulse transformer.

3. The secondary-side controlled AC-DC converter of claim 2, wherein the secondary-side controller comprises:
a first driver coupled to a gate of the secondary-side FET;
a second driver coupled to a primary side of the second pulse transformer; and
a circuit to generate the second control signal.

4. The secondary-side controlled AC-DC flyback converter of claim 2, wherein the second pulse transformer is coupled to a synchronous rectifier gate driver, wherein the synchronous rectifier gate driver is to drive the active clamp FET via the second pulse transformer.

5. The secondary-side controlled AC-DC flyback converter of claim 1, wherein the secondary-side controller is to control the secondary-side FET using a third control signal that is based on the second control signal.

6. The secondary-side controlled AC-DC converter of claim 1, wherein the primary-side controller is coupled to the primary-side FET.

7. The secondary-side controlled AC-DC converter of claim 1, wherein the active clamp FET is an n-type FET (NFET) comprising a floating ground.

8. The secondary-side controlled AC-DC converter of claim 1, wherein the active clamp FET is a p-type FET (PFET) comprising a referenced ground.

9. The secondary-side controlled AC-DC converter of claim 1, further comprising a capacitor coupled between the active clamp FET and a rectified DC line (VIN).

10. The secondary-side controlled AC-DC converter of claim 1, wherein a source of the secondary-side FET is coupled to a GND terminal of a USB-C connector.

11. A method comprising:
generating, by a secondary-side controller in a secondary-side controlled alternating current to direct current (AC-DC) flyback converter, a first control signal, a second control signal, and a third control signal;
controlling, by the secondary-side controller, a secondary-side field effect transistor (FET) coupled to a flyback transformer, using the third control signal, wherein the third control signal is based on the second control signal;
controlling, by the secondary-side controller, a primary-side FET using the first control signal via a primary-side controller across a first pulse transformer coupled between the primary-side controller and the secondary-side controller; and
controlling, by the secondary-side controller, an active clamp FET that is disposed on a primary side of the flyback transformer using the second control signal, wherein the second control signal is sent across a galvanic isolation barrier provided by a second pulse transformer, wherein a gate of the active clamp FET is directly coupled to a primary winding of the second pulse transformer.

12. The method of claim 11, further comprising:
determining, by the secondary-side controller, output power on a direct current (DC) output line;
activating the secondary-side FET and the active clamp FET for a first duration of time in response to determining that the output power is above a threshold; and
de-activating the secondary-side FET and the active clamp FET for a second duration of time in response to determining that the output power is below the threshold.

13. An alternating current to direct current (AC-DC) power adapter device comprising:
a USB-C connector;
a power converter comprising a transformer and a rectifier coupled between AC terminals and DC terminals, the rectifier to convert AC power on the AC terminals to DC power on the DC terminals, and the transformer to provide galvanic isolation between the AC terminals and the DC terminals;
a primary-side field effect transistor (FET);
a secondary-side FET;
an active clamp FET coupled to the secondary-side controller, wherein the active clamp FET is disposed on a primary side of the transformer; and
a secondary-side controller coupled to the transformer, wherein the secondary-side controller is configured to generate a first control signal and a second control signal, the first control signal to control the primary-side FET via a primary-side controller across a first pulse transformer coupled between the primary-side controller and the secondary-side controller, and the second control signal to control the active clamp FET across a galvanic isolation barrier provided by a second pulse transformer, wherein a gate of the active clamp FET is directly coupled to a primary winding of the second pulse transformer.

14. The AC-DC power adapter device of claim 13, wherein the secondary-side controller is to control the secondary-side FET using a third control signal that is based on the second control signal.

15. The AC-DC power adapter device of claim 13, wherein the secondary-side controller comprises:
a first driver coupled to a gate of the secondary-side FET;
a second driver coupled to a primary side of the pulse transformer; and
a circuit to generate the second control signal.

16. The AC-DC power adapter device of claim 13, wherein the second pulse transformer is coupled to a synchronous rectifier gate driver, wherein the synchronous rectifier gate driver is to drive the active clamp FET via the second pulse transformer.

17. The AC-DC power adapter device of claim 13, wherein the primary-side controller is coupled to the primary-side FET.

* * * * *